US008419321B2

(12) United States Patent
Miyanaga

(10) Patent No.: US 8,419,321 B2
(45) Date of Patent: Apr. 16, 2013

(54) WATER FEED APPARATUS FOR CORE DRILL

(75) Inventor: Masaaki Miyanaga, Miki (JP)

(73) Assignee: Kabushiki Kaisha Miyanaga, Miki-shi, Hyogo (JP)

( * ) Notice: Subject to any disclaimer, the term of this patent is extended or adjusted under 35 U.S.C. 154(b) by 1157 days.

(21) Appl. No.: 11/813,670

(22) PCT Filed: Jan. 6, 2006

(86) PCT No.: PCT/JP2006/300074

§ 371 (c)(1),
(2), (4) Date: Nov. 13, 2008

(87) PCT Pub. No.: WO2006/075556

PCT Pub. Date: Jul. 20, 2006

(65) Prior Publication Data

US 2009/0129878 A1 May 21, 2009

(30) Foreign Application Priority Data

Jan. 12, 2005 (JP) ................................ 2005-004950
Aug. 4, 2005 (JP) ................................ 2005-226636

(51) Int. Cl.
*B23B 51/06* (2006.01)

(52) U.S. Cl.
USPC ................................ 408/56; 408/57; 239/302

(58) Field of Classification Search .................... 408/56, 408/57, 59, 61; 239/302, 310, 311, 323, 239/328, 330, 333, 337, 569, 581.1
See application file for complete search history.

(56) References Cited

U.S. PATENT DOCUMENTS 3,547,350 A * 12/1970 Marcoux ...................... 239/308
3,577,808 A * 5/1971 Visser ............................. 408/61
4,358,059 A * 11/1982 Coffee .......................... 239/691
5,419,661 A * 5/1995 Meachum ........................ 408/57
5,613,812 A * 3/1997 Levan et al. .................... 408/56
5,669,743 A * 9/1997 Johnson et al. ................. 408/56
6,371,332 B1 * 4/2002 Fox .............................. 222/190

FOREIGN PATENT DOCUMENTS

GB 2060442 A * 5/1981
JP 58-117303 8/1983
JP 60-38271 3/1985
JP 63-197037 12/1988

(Continued)

OTHER PUBLICATIONS

International Search Report for PCT/JP2006/300074, dated Mar. 14, 2006.

*Primary Examiner* — Daniel Howell
*Assistant Examiner* — Michael Vitale
(74) *Attorney, Agent, or Firm* — Marshall, Gerstein, Borun LLP

(57) ABSTRACT

A water feed apparatus (20) of the present invention includes a water storage tank (40) that stores water for feeding, a pump unit (50) that feeds gas with a pressure to the water storage tank (40), and an adapter (30) that couples between the water storage tank (40) and a core drill (1). The pump unit (50) has a gripper portion (51) whose internal space is enlargingly and reducingly deformable by a gripping operation by an operator to feed the gas to the water storage tank (40). The adapter (30) has a drill-mounting portion (**31*b*) for mounting on the core drill (1), a tank mounting portion (34) where the water storage tank (40) is mounted, a water passage (37) that connects between the drill-mounting portion (31*b*) and the tank mounting portion (34), and a valve unit (33) that opens and closes the water passage (37**).

7 Claims, 9 Drawing Sheets

FOREIGN PATENT DOCUMENTS

| | | | |
|---|---|---|---|
| JP | 03038311 | A * | 2/1991 |
| JP | 4-13246 | | 2/1992 |
| JP | 05-309510 | | 11/1993 |
| JP | 06-219459 | | 8/1994 |
| JP | 11-128789 | | 5/1999 |
| JP | 2001-241891 | | 9/2001 |
| JP | 2004-34210 | | 2/2004 |

* cited by examiner

WATER FEED APPARATUS FOR CORE DRILL

TECHNICAL FIELD

The present invention relates to a water feed apparatus for use with a core drill of a wet type in which a core body is rotationally driven by a drive mechanism to drill a hole in an object to be drilled, and water is fed to cutting blades provided on the core body, and more particularly, to a water feed apparatus which has a compact construction, and which realizes a sufficient water feed even at high-speed rotation of the core body.

BACKGROUND ART

Conventionally, a core drill is widely used for drilling a hole in concrete and the like. This core drill is generally of the construction in which a drive mechanism for generating a rotary power is coupled via a shank to a core body having cutting blades such that, when driven by the drive mechanism, the shank and the core body are rotated integrally. Such a construction is disclosed, for example, in Japanese Patent Application Unexamined Publication No. 2004-34210 (Patent Document 1).

Furthermore, core drills can be classified into wet type and dry type, and in the case of a core drill of a wet type, water is fed during drilling a hole by a water feed apparatus coupled to the core drill so as to cool the cutting blades provided on the core body. Specifically, a transverse hole is formed in a shank coupled to the core body to pass through the shank in a direction perpendicular to its longitudinal direction (radially). The shank is further formed with a vertical hole that extends lengthwise and through the rotational center axis of the shank, which vertical hole is connected at one end thereof to the above transverse hole and opens at the other end thereof at the end portion of the shank on the core body side. Thus, if cooling water is supplied from the water feed apparatus externally mounted on the core drill, the cooling water passes through the above transverse hole and vertical hole of the shank to be sent to and cool the cutting blades on the core body.

As an example of a water feed apparatus, there is one that includes a relatively large-sized stationary water tank and pressure pump, with the water tank being coupled to the core drill by means of a hose. In the case of this water feed apparatus, compressed air can be introduced into the water tank by the pressure pump, and cooling water is fed with a pressure to the core drill by expansion of the compressed air.

As another example of a water feed apparatus, there is one of a natural fall water feed system that includes a water-pouring cup with a water outlet located at a lower portion thereof. In the case of this water feed apparatus, the cooling water stored in the water-pouring cup is sent out through the water outlet under the action of gravity, and is fed through the transverse and vertical holes formed in the shank of the core drill to the core body.

Patent document 1: Japanese Patent Application Unexamined Publication No. 2004-34210.

DISCLOSURE OF THE INVENTION

Problem to be Solved by the Invention

However, with the former one of the water feed apparatuses as mentioned above, while the included large-sized water tank and pressure pump enable a sufficient water feed to the cutting blades even during rotation of the shank at high speeds, an improvement is difficult to make in the in job site portability of the core drill for drilling work of a hole. On the other hand, where the latter water feed apparatus is employed, although it is excellent in the job site portability of the core drill, since cooling water is not fed with a pressure, but merely poured by its own weight, difficulty is encountered in securing a sufficient water supply at high-speed rotation of the shank, making it difficult to improve the rotational speed of the shank. In other words, the cooling water sent into the transverse hole of the rotating shank during drilling a hole can reach the vertical hole by having a water pressure that exceeds the centrifugal force resulting from the rotation of the shank. As such, with the water feed apparatus of a natural fall water feed system, the relatively low pressure of the cooling water prevents enhancement of the rotational speed of the shank.

The present invention has been made under such circumstances, and an object thereof is to provide a water feed apparatus which does not require a large-sized water tank and improves the portability, and which makes it possible for cooling water to be easily compressed and thus for the core drill to be operated at high speeds.

Means to Solve the Problem

In order to attain the above object, a water feed apparatus for a core drill of a wet type that drills a hole in an object to be drilled by rotating a core body and feeds water to cutting blades provided on the core body, comprises: a water storage tank that stores water for feeding, a pump unit that feeds gas with a pressure to the water storage tank, and an adapter that couples the water storage tank to the core drill, wherein the pump unit has a gripper portion whose internal space is enlargingly and reducingly deformable by a gripping operation by an operator to feed the gas to the water storage tank, and wherein the adapter has a drill-mounting portion for mounting on the core drill, a tank mounting portion by which the water storage tank is mounted to the adapter, a water passage that connects the drill-mounting portion to the tank mounting portion, and a valve unit that opens and closes the water passage.

With such construction, pressurized air can be sent into the water storage tank by a gripping operation of the gripper portion which is easily done by an operator, and water can be fed with a pressure from inside the water storage tank to the core drill. The gripper portion is relatively compact in structure and adapted for gripping by the operator. A water feed apparatus is thus realized that enables an improvement in the portability and high-speed rotation of the core drill.

The above gripper portion of the pump unit may comprise a flexible member substantially of spherical shell shape that is deformable by the gripping operation by the operator. With such construction, an operator can easily perform the gripping operation, and the simplicity of the construction leads to improvement in productivity.

The above pump unit may have a first check valve that permits air to flow only from outside to the internal space of the gripper portion, and a second check valve that permits air to flow only from the internal space of the gripper portion to the water storage tank side. With such construction, by the gripper portion of the pump unit being grippingly operated by an operator, feeding with a pressure of external air to the water storage tank and prevention of water from escaping from inside the water storage tank to the gripper portion side can be realized with a simple structure.

The above tank mounting portion may be constructed such that the water storage tank is mounted thereon with an water outlet thereof directed downward. With such construction, water can be efficiently fed from inside the water storage tank to the core drill.

The above adapter may have a pump mounting portion by which the pump is mounted to the adapter, and an air passage that connects the tank mounting portion to the pump mounting portion, and the internal space of the gripper portion of the pump unit may be connected via the air passage of the adapter to an internal space of the water storage tank. With such construction, since the pump unit in addition to the water storage tank is mounted on the adapter, a more compact water feed apparatus can be realized.

The above tank mounting portion of the adapter may be constructed such that the water storage tank is detachably mounted thereon. With such construction, the water storage tank can be easily refilled with water, while resulting in excellent maintainability.

The above tank mounting portion of the adapter may be formed with an internal thread which is constructed so as to allow screwing therein of an external thread formed on a plastic beverage bottle for threading thereon of a cap. With such construction, a commercially available plastic beverage bottle can be made use of, resulting in a reduction in cost.

Furthermore, a flexible tube for guiding water from inside the water storage tank to the water passage may be coupled at one end thereof to the tank mounting portion of the adapter and equipped at an opposite end thereof with a sinker. With such construction, if, for example, the water storage tank is mounted on the tank mounting portion of the adapter even with its water outlet directed upward, since the sinker equipped on the tube is located on the water bottom side (on the inner bottom side of the water storage tank), water can be guided through the tube to the water passage. Conversely, if the water storage tank has its water outlet directed downwards, since the sinker equipped on the tube is also located on the water bottom side (on the water outlet side), water can be guided through the tube to the water passage.

The above tube may be constructed such that the opposite end is located downwardly inside the water storage tank by a gravitational weight of the sinker, irrespective of a posture of the water storage tank. With such construction, water can be guided from inside the water storage tank through the opposite end of the tube to the water passage, irrespective of whether the water outlet of the water storage tank is directed upward or downward, thereby enabling the drilling work of a hole.

Effect of the Invention

According to the present invention, a water feed apparatus can be provided which does not require a large-sized water tank and improves the portability, and which makes it possible for cooling water to be easily compressed and thus for the core drill to be operated at high speeds.

DESCRIPTION OF SYMBOLS

Figure 1:
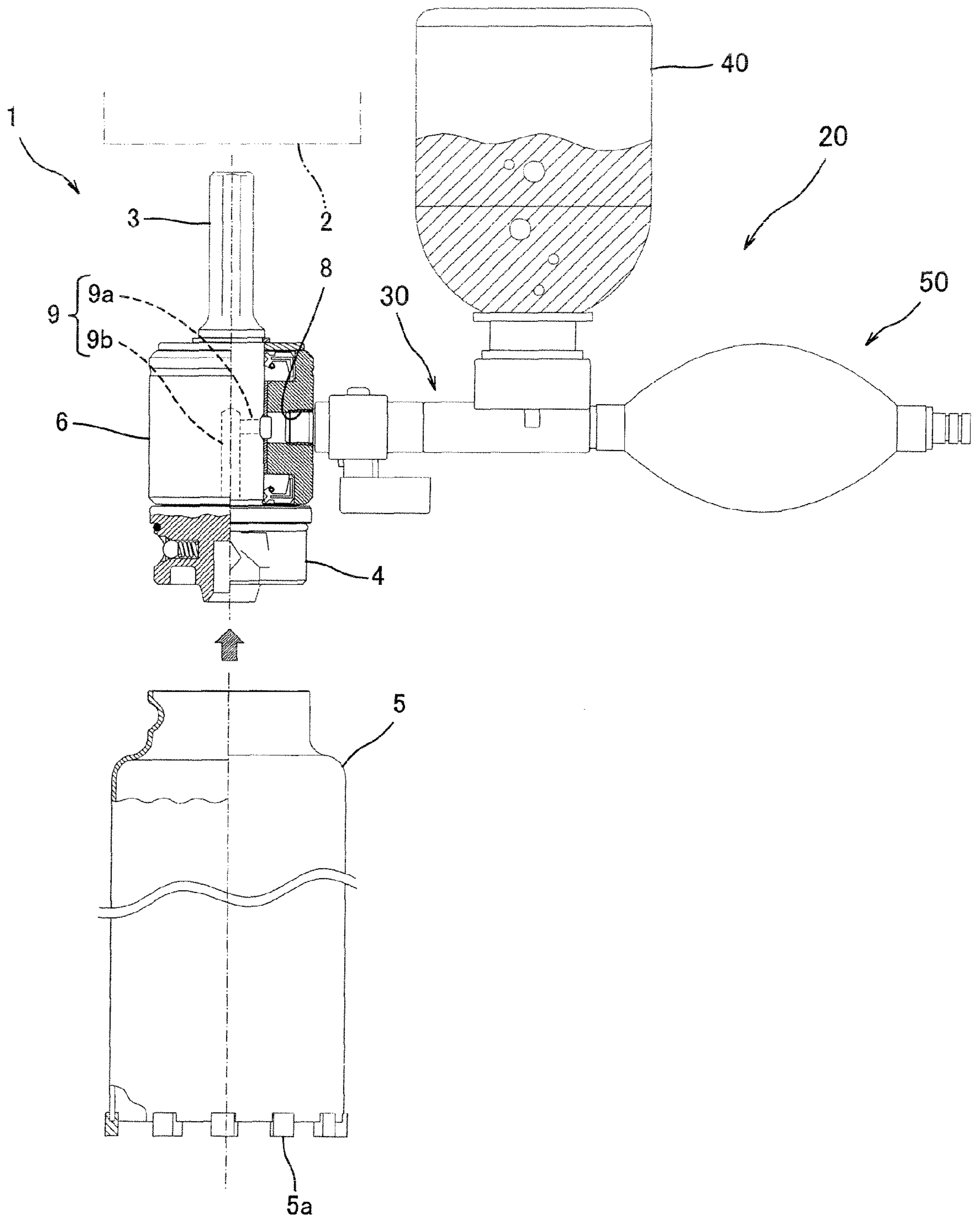
FIG. 1 is an exterior perspective view showing, partly in section, a water feed apparatus according to an embodiment of the present invention, and a core drill whereon the water feed apparatus is mounted.

1: Core drill
3: Shank
5: Core body
5*a*: Cutting blade
6: Sleeve
8: Water feed apparatus mounting unit
9: Cooling water passage
20: Water feed apparatus
30: Adapter
31: First adapter
31*b*: Drill-mounting portion
32: Second adapter
32*c*: Pump mounting portion
33: Inductor cock
34: Tank mounting portion
37: Water passage
38: Air passage
40: Water storage tank
50: Pump unit
51: Air feed spherical body (gripper portion)
51*a*: Internal space
52*a*: First check valve body
53*a*: Second check valve body
60: Water feed apparatus
60*a*: Adapter
61: First adapter
62: Second adapter
63: Water passage
64: Air passage
65: Pipe-like projection
70: Tube
72: Sinker
80: Water flow tube

BEST MODE FOR CARRYING OUT THE INVENTION

A water feed apparatus according to an embodiment of the present invention will now be described in detail with reference to the drawings. FIG. 1 is an exterior view showing, partly in section, a water feed apparatus according to an embodiment of the present invention, and a core drill on which the water feed apparatus is mounted. As shown in FIG. 1, the core drill 1 has a shank 3 that is supported at an upper portion thereof, via a chuck (not shown), on a drive shaft (not shown) of a drive mechanism 2 (indicated by a two-dotted line in FIG. 1). An upper portion of a cylindrical core body 5 is coupled via an attachment/detachment mechanism 4 to a lower portion of the shank 3, such that the shank 3 and the core body 5 are rotated integrally in conjunction with the rotation of the drive shaft of the drive mechanism 2. Furthermore, the core body 5 is provided at the lower circumferential end with cutting blades 5*a* for drilling a hole that are spaced in a circumferential direction at predetermined intervals.

A cylindrical sleeve 6 is fitted over a central part in a longitudinal direction of the shank 3 such that the shank 3 is rotatably supported by the sleeve 6 via a bearing provided inside the sleeve 6. A throughhole is formed in a circumferential wall of the sleeve 6 to extend in a horizontal direction in FIG. 1 and communicate in and out of the sleeve 6, which throughhole constitutes a water feed apparatus mounting unit 8 for mounting a later-described water feed apparatus 20.

A transverse hole 9*a* is formed in the shank 3 supported by the sleeve 6 to extend radially (horizontally in FIG. 1) through the shank 3. The transverse hole 9*a* is formed at a position corresponding to the water feed apparatus mounting unit 8 of the sleeve 6 and connected intermittently with the water feed apparatus mounting unit 8 during rotation of the shank 3.

Furthermore, a vertical hole 9*b* is formed lengthwise and through a rotational center axis of the shank 3. The vertical hole 9*b* is connected at an upper end portion thereof to a longitudinally central position of the transverse hole 9*a* and communicates with the inside of the transverse hole 9*a*, and opens at a lower end portion thereof into an internal space of the core body 5. The transverse hole 9*a* and the vertical hole 9*b* as described above make up a cooling water passage 9 that guides the cooling water supplied from the water feed apparatus 20 to the core body 5.

On the other hand, the water feed apparatus 20, which is coupled to the water feed apparatus mounting unit 8 of the sleeve 6, is mainly composed of an adapter 30, a water storage tank 40, and a pump unit 50. As shown in FIG. 1, both the water storage tank 40 and the pump unit 50 are mounted on the adapter 30, and the coupling of the adapter 30 to the water feed apparatus mounting unit 8 completes the mounting of the water feed apparatus 20 to the core drill 1.

Figure 2:
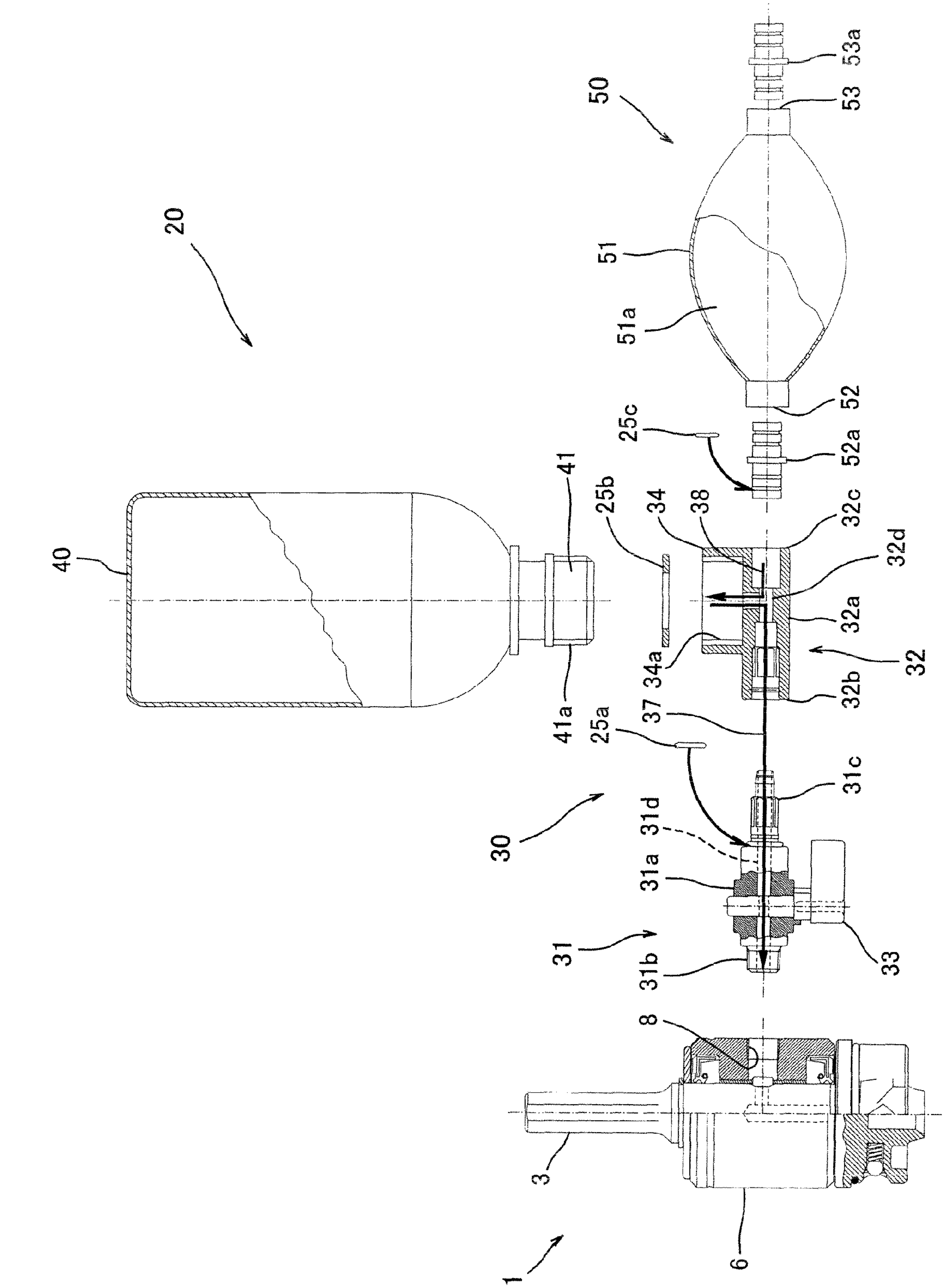
FIG. 2 is an exploded view showing, partly in section, the water feed apparatus as shown in FIG. 1.

FIG. 2 is an exploded view of the water feed apparatus 20, with a part of its structure shown in section. As shown in FIG. 2, the adapter 30 is constructed from a first adapter 31 and a second adapter 32, the first adapter 31 being provided with an inductor cock 33.

More specifically, the first adapter 31 has a substantially pipe-shaped main body 31*a*, one end portion of which forms a drill-mounting portion 31*b* for coupling to the water feed apparatus mounting unit 8 of the sleeve 6 of the core drill 1. The other end portion of the main body 31*a* forms a joint 31*c* for coupling to the second adapter 32. The main body 31*a* of the first adapter 31 is internally formed with a first passage 31*d* that extends and connects between the drill-mounting portion 31*b* and the joint 31*c*. In addition, the first passage 31*d* is provided at a halfway point thereof with the inductor cock 33 as referred to above, which, when operated, opens and closes the first passage 31*d* while its open degree is adjusted.

The second adapter 32 has a substantially pipe-shaped main body 32*a*, one end portion of which forms a joint 32*b* for coupling to the joint 31*c* of the first adapter 31. The other end portion of the main body 32*a* forms a pump mounting portion 32*c* for coupling the pump unit 50 thereto. The main body 32*a* of the second adapter 32 is internally formed with a second passage 32*d* that extends and connects between the joint 32*b* and the pump mounting portion 32*c*.

The first adapter 31 and the second adapter 32 are coupled together by fitting the joint 31*c* of the first adapter 31 into the joint 32*b* of the second adapter 32 via a seal member (for example, O-ring) 25*a*. In the thus coupled state, the first passage 31*d* of the first adapter 31 and the second passage 32*d* of the second adapter 32 are connected to each other.

A cylindrical tank mounting portion 34 is provided on top of the main body 32*a* of the second adapter 32 for mounting the water storage tank 40, and an internal space of the tank mounting portion 34 is connected with the second passage 32*d*. Here, the path from the internal space of the tank mounting portion 34 through the second passage 32*d* of the second adapter 32 and the first passage 31*d* of the first adapter 31 to the drill-mounting portion 31*b* constitutes a water passage 37 for guiding cooling water from the water storage tank 40 to the core drill 1. Likewise, the path from the pump mounting portion 32*c* of the second adapter 32 through the second passage 32*d* to the tank mounting portion 34 constitutes an air passage 38 that guides air from the pump unit 50 to the water storage tank 40.

The cylindrical tank mounting portion 34 has an internal thread 34*a* threaded on an internal wall thereof. In the present embodiment, the water storage tank 40 shown in FIG. 2 is a commercially available plastic beverage bottle whose mouth is formed with an external thread 41*a*. Meanwhile, the internal thread 34*a* of the tank mounting portion 34 is formed so as to screw on the external thread 41*a* of the water storage tank 40. The water storage tank 40 and the second adapter 32 are detachably coupled by screwing together their respective external thread 41*a* and internal thread 34*a* via a seal member (for example, packing) 25*b* disposed therebetween.

The pump unit 50 has an air feed spherical body (gripper portion) 51 substantially of spherical shell shape (more specifically, substantially of elliptical contour as viewed from the side) that is made of a resilient material such as rubber. This air feed spherical body 51 is constructed so as to be relatively easily deformable by the grasping power of an operator, and its internal space 51*a* is enlargingly and reducingly deformed by a gripping operation of the operator.

The air feed spherical body 51 is provided with two openings 52 and 53, and one end portion of a pipe-shaped first check valve body 52*a* is coupled to one opening 52 of these openings. The other end portion of the first check valve body 52*a* is coupled via a seal member (for example, O-ring) 25*c* to the pump mounting portion 32*c* of the second adapter 32, such that the internal space 51*a* of the air feed spherical body 51 is connected via the first check valve body 52*a* to the second passage 32*d* of the second adapter 32. Furthermore, the first check valve body 52*a* has a not-shown check valve mechanism incorporated therein that permits the flow of air only from the air feed spherical body 51 side to the second adapter 32 side and blocks the reverse direction flow of air (or water).

One end portion of a pipe-shaped second check valve body 53*a* is coupled to the other opening 53 of the air feed spherical body 51. The other end portion of this second check valve body 53*a* opens to the outside such that the outside and the internal space 51*a* of the air feed spherical body 51 are communicated via the second check valve body 53*a*. The second check valve body 53*a* has a not-shown check valve mechanism incorporated therein that permits the flow of air only from the outside to the air feed spherical body 51 side and blocks the reverse direction flow of air (or water).

With such pump unit 50, if an operator grippingly operates the air feed spherical body 51, its internal space 51*a* undergoes expansion and contraction. When the internal space 51*a* expands, external air is taken into the air feed spherical body

51 through the second check valve body 53*a*, and when the internal space 51*a* contracts, air is fed with a pressure from inside the air feed spherical body 51 through the first check valve body 52*a* to the second adapter 32 side. Moreover, the air fed with a pressure to the second adapter 32 is sent through the air passage 38 to the water storage tank 40.

The thus constructed water feed apparatus 20 is assembled to the core drill 1 by fitting the drill-mounting portion 31*b* of the first adapter 31 in the water feed apparatus mounting unit 8 of the sleeve 6 of the core drill 1.

Figure 3A:
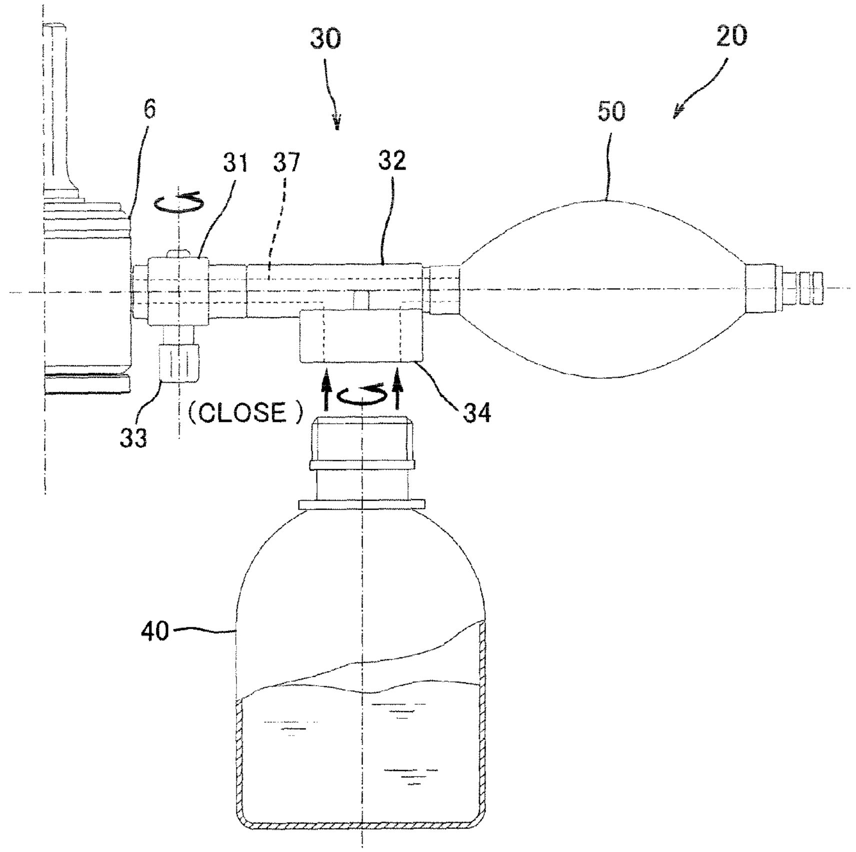
FIG. 3 is a view showing the procedure for using the water feed apparatus as shown in FIG. 1, with FIG. 3(*a*) mainly illustrating the mounting of a water storage tank, and FIG. 3(*b*) illustrating the handling of an adapter.
Figure 3B:
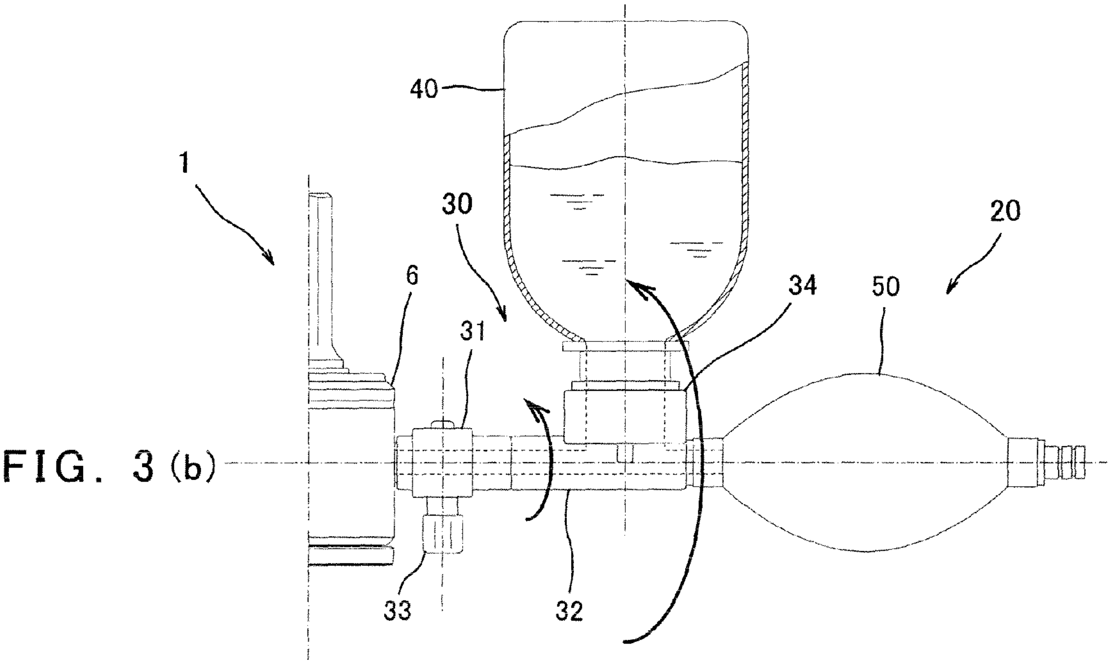

Next, description will be made of the procedure for using the water feed apparatus 20 assembled to the core drill 1, with reference to FIGS. 3 and 4. First, cooling water as much as approximately half the capacity of the water storage tank 40 is filled in the water storage tank 40 which is then screwed in the tank mounting portion 34 (see FIGS. 3(*a*) and (*b*)). In this instance, the inductor cock 33 is operated beforehand to put the water passage 37 (first passage 31*d*) in a closed state. Here, since the second adapter 32 is rotatable relative to the first adapter 31 with the sealing ability maintained, if the second adapter 32 is rotated to have its tank mounting portion 34 directed downwards, the operation of screwing the water storage tank 40 will be easier (see FIG. 3(*a*)). After completion of the screwing, the second adapter 32 is again rotated to dispose the water storage tank 40 on the upper side (see FIG. 3(*b*)).

Figure 4A:
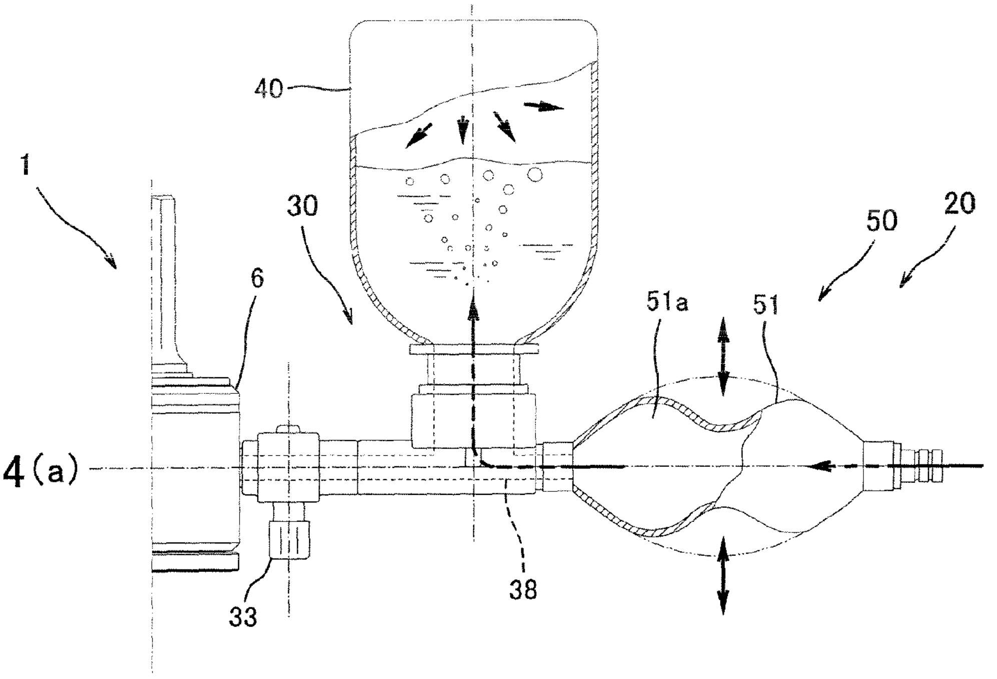
FIG. 4 is a view showing the procedure for using the water feed apparatus as shown in FIG. 1, with FIG. 4(*a*) illustrating the operation of a pump unit, and FIG. 4(*b*) illustrating the operation of an inductor cock.
Figure 4B:
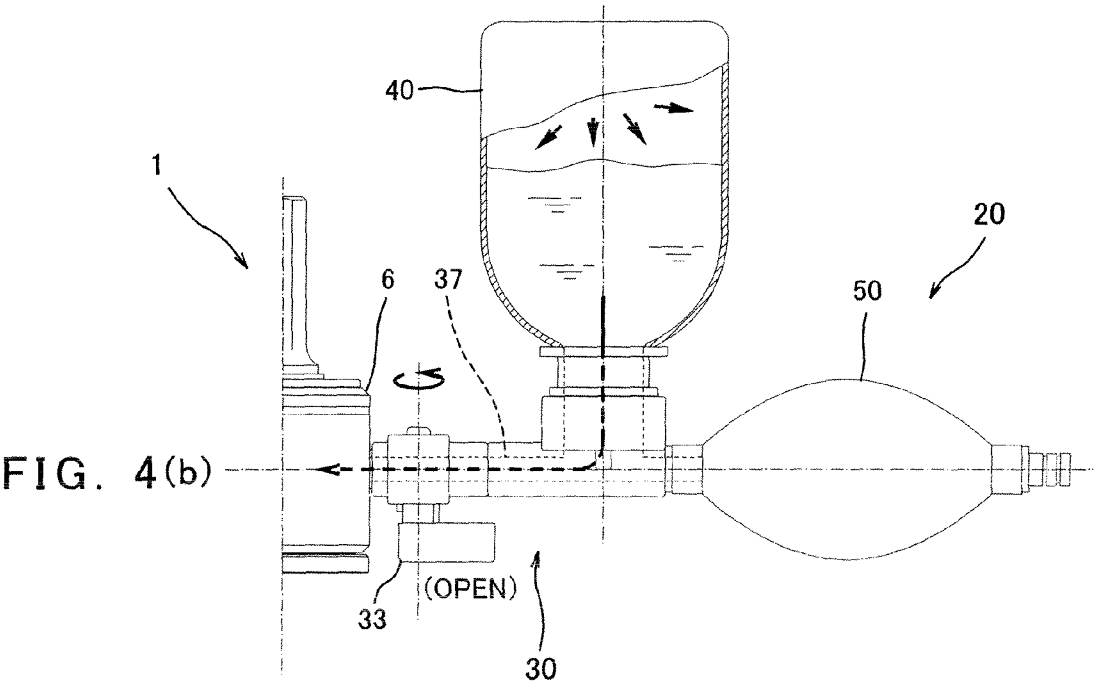

After the water storage tank 40 has been set, the air feed spherical body 51 of the pump unit 50 is gripped for operation by an operator (see FIG. 4(*a*)). In other words, gripping and loosening actions by hand of the air feed spherical body 51 are repeated several times by the operator. This allows the air, taken from the outside via the pump unit 50 into the adapter 30, to pass through the air passage 38 and be collected in the empty space (space not occupied by cooling water) inside the water storage tank 40, and to pressurize the air in that space. During this operation, the first check valve body 52*a* (see FIG. 2) acts to prevent any of the cooling water inside the water storage tank 40 from escaping back into the air feed spherical body 51.

When the pressure of air inside the water storage tank 40 reaches an appropriate point, the gripping operation of the air feed spherical body 51 is stopped, and the inductor cock 33 is opened while adjusting its open degree (see FIG. 4(*b*)). This allows cooling water, under the action of pressurized air, to be fed with a pressure from inside the water storage tank 40 through the water passage 37 to the core drill 1 side. The core drill 1 in the present embodiment is thus used with cooling water being fed, which cooling water is sent through the cooling water passage 9 to the cutting blades 5*a* at a lower portion of the core body 5, and cools same. Incidentally, during use of the core drill 1, the shank 3 and the core body 5 rotate at a high speed, but the water feed apparatus 20, being attached to the sleeve 6 that rotatably supports the shank 3, does not rotate with the shank 3.

According to the thus constructed water feed apparatus 20, since the water storage tank 40 and pump unit 50 formed to relatively small size are fixedly mounted via the adapter 30 on the core drill 1, an excellent portability is obtained. Furthermore, since cooling water inside the water storage tank 40 can be fed with a pressure to the core drill 1 through operation of the pump unit 50, supply of cooling water can appropriately be performed even at high-speed rotation of the shank 3.

Although, in the above example, the construction has been described in which the water storage tank 40 and the pump unit 50 are fixedly coupled to the adapter 30, the coupling to the adapter may be made in a flexible manner by, for example, a hose or the like insofar as the portability is not marred. Moreover, the construction illustrated is an example to which the present invention can preferably be applied, and the water feed apparatus of the present invention is not limited to such construction. For example, in place of the air feed spherical body 51 of spherical shell shape of the pump unit 50, a cylindrical gripper portion that is bellows-shaped at a circumferential portion thereof and closed at both ends, or yet another construction may be employed.

In addition, a container other than a plastic beverage bottle may be used as the water storage tank 40, and may be constructed so as not to be detachable from the adapter 30. In this case, the water storage tank 40 can be provided with a water intake that is sealable.

Next, a water feed apparatus 60 according to another embodiment will be described with reference to FIG. 5. The water feed apparatus 60 shown in FIG. 5 includes an adapter 60*a*, and a pump unit 50 having the same construction as that already described. The adapter 60*a* is composed of a first adapter 61 of the same construction as the first adapter 31 of the adapter 30 employed in the already-described water feed apparatus 20, and a second adapter 62 of different construction from the second adapter 32. Incidentally, of the parts shown in FIG. 5, those that have the same construction as already described in connection with FIGS. 1 to 4 are given the same reference symbols, and their detailed description will be omitted.

The second adapter 62 has a substantially pipe-shaped main body 62*a*, one end portion of which forms a joint 32*b* for coupling to a joint 31*c* of the first adapter 61, and the other end portion of which forms a pump mounting portion 32*c* where the pump unit 50 is coupled. Furthermore, a cylindrical tank mounting portion 34 for mounting the water storage tank 40 thereat is provided on the main body 62*a* between the joint 32*b* and the pump mounting portion 32*c*.

A water passage 63 extends in the joint 32*b* along the center axis of the main body 62*a* and is bent at a halfway point to lead to the tank mounting portion 34. The water passage 63 opens at one end at the end portion of the joint 32*b* and opens at the other end to the internal space of the tank mounting portion 34. A pipe-like projection 63*a* extends inside the internal space of the tank mounting portion 34, in a direction from the inner bottom toward the opening of the tank mounting portion 34, and has an internal passage that forms the other end portion of the water passage 63. An air passage 64 also extends in the pump mounting portion 32*c* along the center axis of the main body 62*a* and is bent at a halfway point to lead to the tank mounting portion 34. The air passage 64 opens at one end at the end portion of the pump mounting portion 32*c* and opens at the other end at the inner bottom and toward the internal space of the tank mounting portion 34.

The first adapter 61 and the second adapter 62 are coupled together by fitting the joint 31*c* of the first adapter 61 in the joint 32*b* of the second adapter 62 via a seal member 25*a*, and in this state, the first passage 31*d* of the first adapter 61 and the water passage 63 of the second adapter 62 are connected to each other. Additionally, as for the second adapter 62 and the pump unit 50, the first check valve body 52*a* of the pump unit 50 is coupled via a seal member 25*c* to the pump mounting portion 32*c* of the second adapter 62, and in this state, the internal space 51*a* of the air feed spherical body 51 of the pump unit 50 is connected to the air passage 64 of the second adapter 62. Thus, on grippingly operating the air feed spherical body 51 of the pump unit, the air drawn from the outside into the air feed spherical body 51 is sent through the air passage 64, which is independent of the water passage 63, to the tank mounting portion 34, so as to be fed into the water storage tank 40 if the water storage tank 40 is being attached to the tank mounting portion 34.

A flexible tube 70 is provided in the tank mounting portion 34 of the second adapter 62 for sending out water from inside the water storage tank 40 to the water passage 63. This tube 70 has a dimension equal to or slightly longer than the height dimension of the water storage tank 40, and has a proximal end portion thereof (portion downstream of water flow) fitted over and coupled to the pipe-like projection 63*a* provided inside the tank mounting portion 34 of the second adapter 62. Moreover, the tube 70 is equipped at a distal end portion thereof (portion upstream of water flow) with a block-like sinker 72. The tube 70 is housed inside the water storage tank 40 when attaching the water storage tank 40 with water poured therein to the tank mounting portion 34 of the second adapter 62.

Figure 6A:
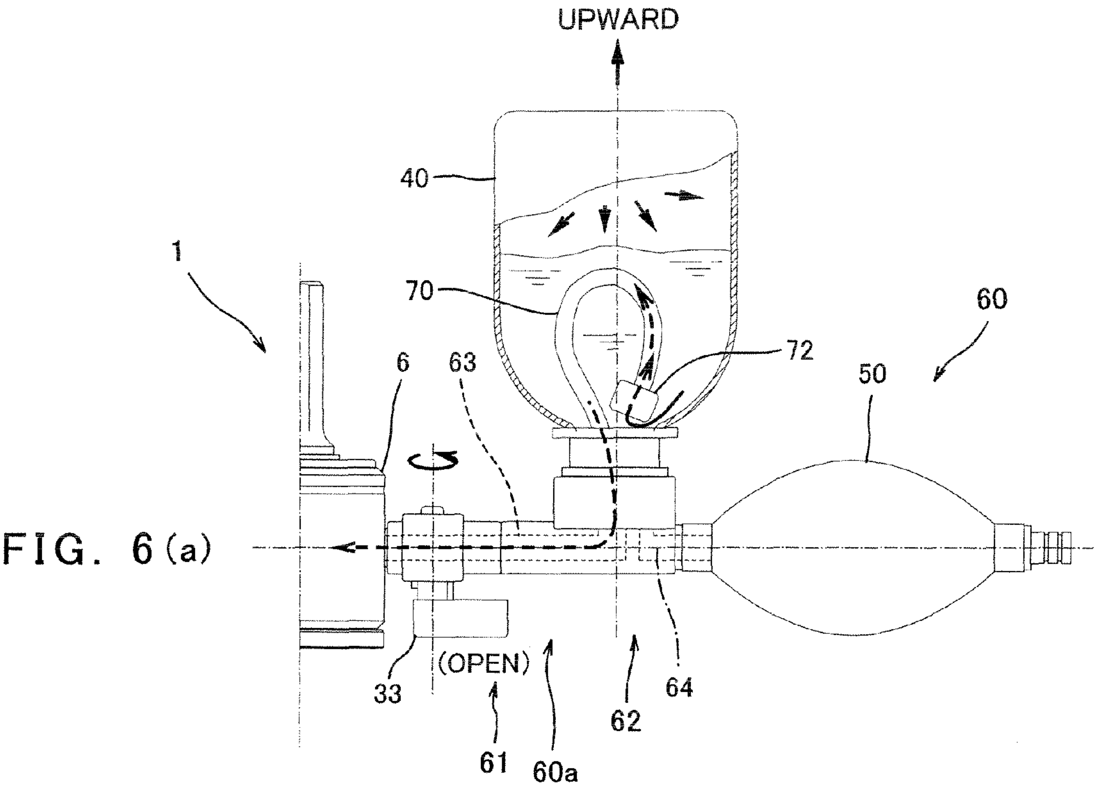
FIG. 6 is a view showing the water feed apparatus as shown in FIG. 5 when it is in use, with FIG. 5(*a*) illustrating when a hole is drilled downward, and FIG. 5(*b*) illustrating when a hole is drilled upward.
Figure 6B:
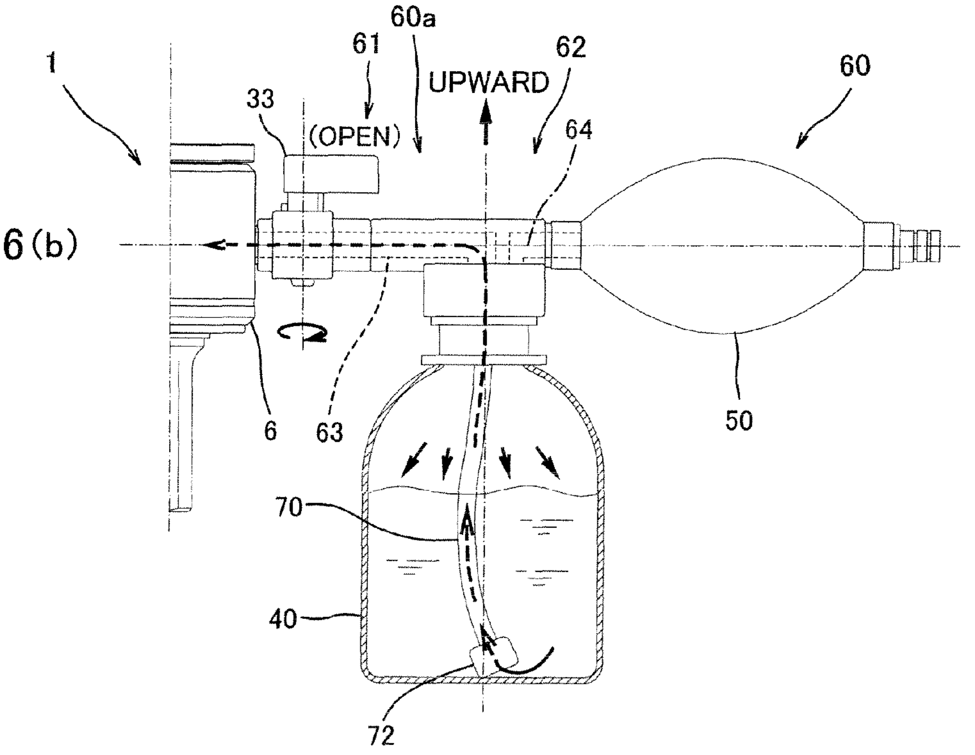

The state of the water feed apparatus 60 in use will be described with reference to FIG. 6. FIG. 6(*a*) illustrates the state when drilling a hole downwards, and FIG. 6(*b*) illustrates the state when drilling a hole upwards. As shown in FIG. 6(*a*), in the case of drilling downwards, the water storage tank 40 is directed such that its mouth 41 is located on the lower side for the purpose of keeping the water storage tank 40 from interference with the surface to be drilled such as a concrete wall surface. At this time, the tube 70 inside the water storage tank 40 is caused to sink to the water bottom side (mouth 41 side of the water storage tank 40) by the gravitational weight of the sinker 72 equipped on the tube distal end portion. As a result, the tube 70 can take in water through its distal end portion and guide the water to the water passage 63 of the second adapter 62.

On the other hand, where a hole is drilled upwards as shown in FIG. 6(*b*), the water storage tank 40 is directed such that its mouth 41 is located on the upper side for the purpose of avoiding interference between the surface to be drilled and the water storage tank 40. At this time, the tube 70 inside the water storage tank 40 is caused to sink to the water bottom side (bottom side of the water storage tank 40) by the gravitational weight of the sinker 72 equipped on the tube distal end portion. As a result, the tube 70 can take in water through its distal end portion and guide the water to the water passage 63. Furthermore, although not shown, also in the case of drilling leftwards or rightwards, the distal end portion of the tube 70 is caused to be located on the water bottom side by the gravitational weight of the sinker 72, thereby enabling water to be taken in.

Figure 5:
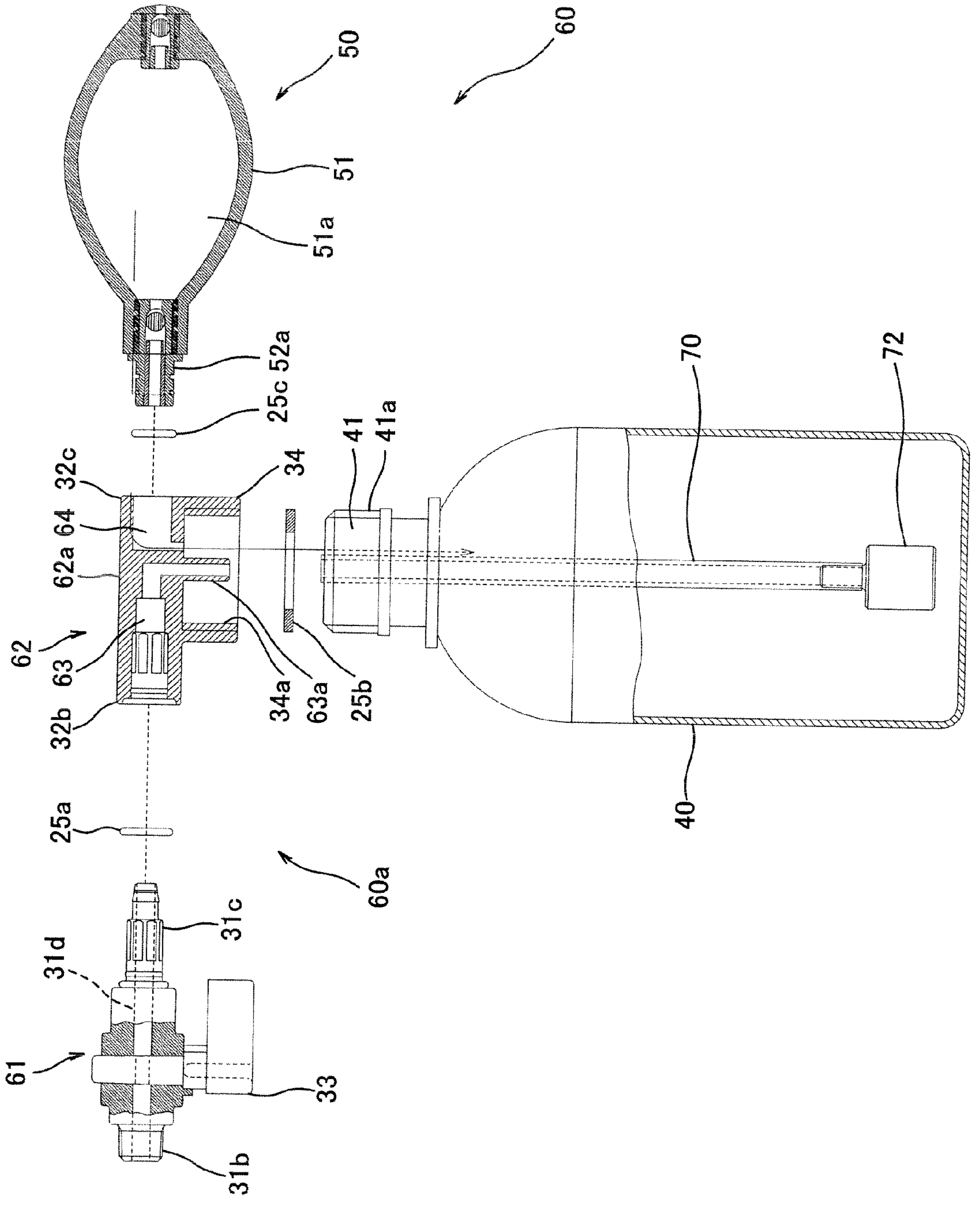
FIG. 5 is an exploded view showing a water feed apparatus according to another embodiment of the present invention.

Thus, with the water feed apparatus 60 shown in FIG. 5, water can be guided from inside the water storage tank 40 through the tube 70 to the water passage 63 and fed to the cutting blades 5*a* of the core body 5 (see FIG. 1), irrespective of the direction of drilling a hole and of the water storage tank 40.

Although the above description of the water feed apparatus 60 focuses on a construction in which the sleeve 6 of the core drill 1, the first adapter 61, the second adapter 62, and the pump unit 50 are fixedly coupled to one another, the present invention is not restricted to such construction.

Figure 7:
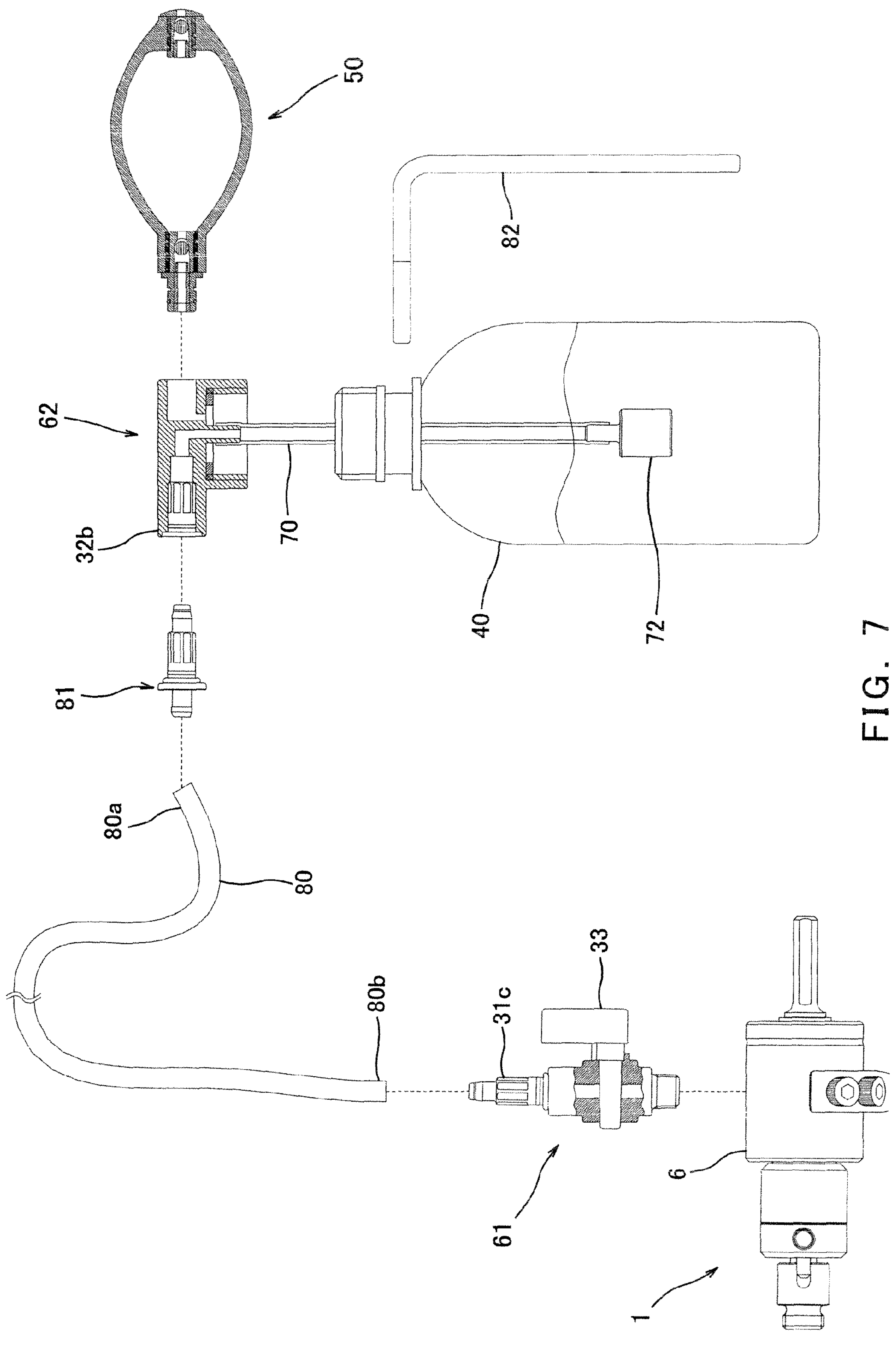
FIG. 7 is an exploded view showing a water feed apparatus according to yet another embodiment of the present invention.

For example, in the water feed apparatus 60, a flexible water flow tube 80 made of silicon or the like may be used to couple between the first adapter 61 and the second adapter 62 as shown in FIG. 7, instead of directly coupling them together. In this case, an upstream side end portion 80*a* of the water flow tube 80 may be coupled via another joint 81 to the joint 32*b* of the second adapter 62, and a downstream side end portion 80*b* of the water flow tube 80 may be coupled via yet another joint (not shown) to the joint 31*c* of the first adapter 61 according to need.

Furthermore, the water feed apparatus 60 shown in FIG. 7 includes a carrying hook 82 for hanging the water storage tank 40 on a waist belt (not shown) or the like of an operator. Where a plastic beverage bottle is used as the water storage tank 40, a commercially available carrying hook for plastic bottles may be used for this carrying hook 82.

In this case, drilling work of a hole in an object with the core drill 1 can be carried out with the water storage tank 40, the pump unit 50, and the second adapter 62 collectively hung on the waist belt or the like, resulting in improvement in convenience. In other words, while an operator holds the core drill 1 in his hands, the water storage tank 40, which weighs heavy, can be independently supported at a different region such as on the waist belt, thereby leading to an improved workability. In this connection, it is desired that the length dimension of the water flow tube 80 be approximately 1 to 1.5 m from the viewpoint of not compromising the improvement in workability.

Figure 8:
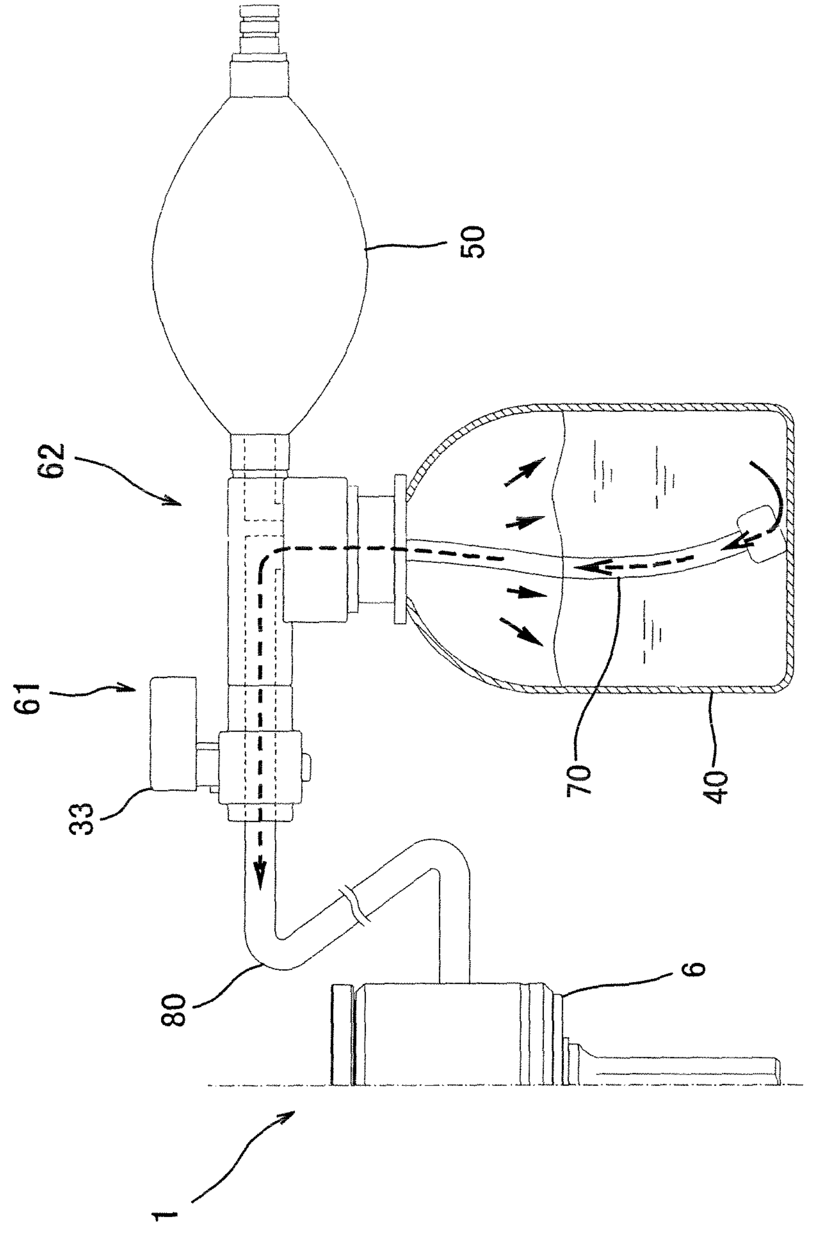
FIG. 8 is a view showing the exterior of a water feed apparatus according to yet another embodiment of the present invention.

Furthermore, as in the water feed apparatus 60 shown in FIG. 8, the first adapter 61 and the second adapter 62 may be fixedly coupled, and a water flow tube 80 may be used to couple the first adapter 61 and the sleeve 6 of the core drill 1. Also in this case, an improvement in workability can be made, as with the water storage tank 60 of the construction shown in FIG. 7.

Figure 9:
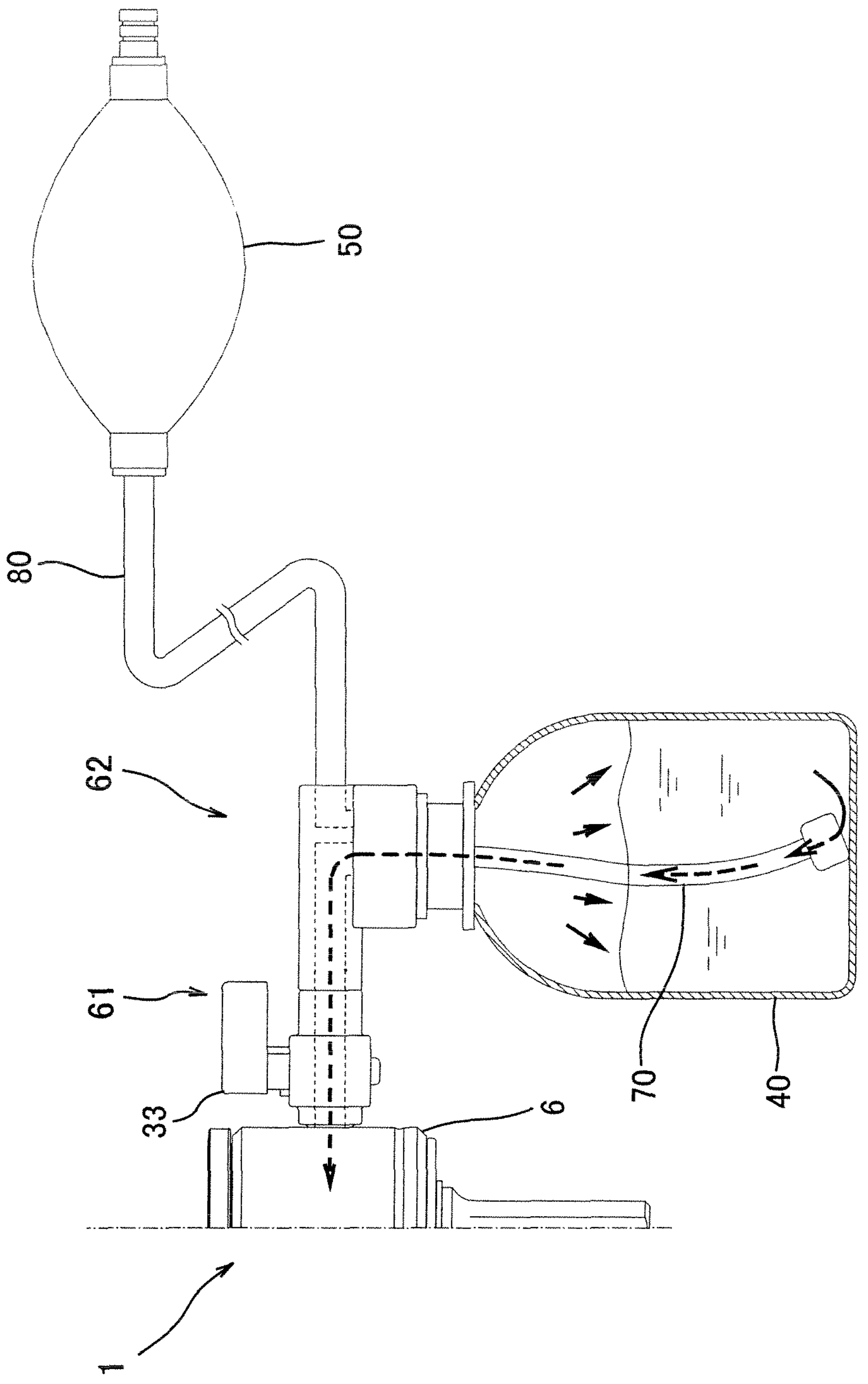
FIG. 9 is a view showing the exterior of a water feed apparatus according to still another embodiment of the present invention.

In addition, as in the water feed apparatus 60 shown in FIG. 9, a water flow tube 80 may be used to couple between the second adapter 62 and the pump unit 50, or a construction may be adopted in which couplings shown in FIGS. 7 to 9 are used in combination.

Incidentally, of the parts shown in FIGS. 7 to 9, those that have the same construction as already described are given same reference symbols, and their detailed description is omitted here. Besides, needless to say, the constructions including the water flow tube 80 shown in FIGS. 7 to 9 are not limitedly employed in the water feed apparatus 40 shown in FIGS. 5 and 6, but also applicable to the water feed apparatus 20 already described with reference to FIGS. 1 to 4.

INDUSTRIAL APPLICABILITY

The present invention is applied to a water feed apparatus for a wet-type core drill that drills a hole in concrete or the like. In particular, the present invention can preferably be applied as a water feed apparatus which does not require a large-sized water tank and improves the portability, and which makes it possible for cooling water to be easily compressed and thus for the core drill to be operated at high speeds.

What is claimed is:

1. A water feed apparatus for a core drill of a wet type that drills a hole in an object to be drilled by rotating a core body and feeds water to cutting blades provided on the core body, comprising:

a water storage tank that stores water for feeding;

a pump unit that feeds gas with a pressure to the water storage tank; and an adapter that couples the water storage tank, the pump unit, and the core drill to each other, wherein the pump unit has a gripper portion whose internal space is enlargingly and reducingly deformable by a gripping operation by an operator to feed the gas to the water storage tank, wherein the adapter includes a first adapter having a drill-mounting portion for mounting on the core drill, and a second adapter having a tank mounting portion by which the water storage tank is removably mounted to the adapter and a pump mounting portion by which the pump unit is mounted to the adapter, the first adapter and the second adapter include a water passage that connects the drill-mounting portion to the tank mounting portion, the first adapter includes a valve unit that opens and closes the water passage, and wherein the second adapter further includes an air passage through which the tank mounting portion and the pump mounting portion are connected to each other, and is rotatably connected to the first adapter so that a mounting direction of the water storage tank mounted to the tank mounting portion is changeable; and wherein the first adapter and the second adapter are coupled together by a flexible water flow tube;

and including a carrying hook arranged to hang the water storage tank, the pump unit, and the second adapter on a body of an operator.

2. The water feed apparatus for the core drill according to claim 1, wherein the gripper portion of the pump unit comprises a flexible member substantially of a spherical shell shape that is bendable by the gripping operation by the operator.

3. The water feed apparatus for the core drill according to claim 1, wherein the pump unit comprises a first check valve that permits air to flow only from outside to the internal space of the gripper portion, and a second check valve that permits air to flow only from the internal space of the gripper portion to the water storage tank side.

4. The water feed apparatus for the core drill according to claim 1, wherein the tank mounting portion of the adapter is formed with an internal thread which is constructed so as to allow screwing therein of an external thread formed on a plastic beverage bottle for threading thereon of a cap.

5. The water feed apparatus for the core drill according to claim 3, wherein the tank mounting portion is constructed such that the water storage tank is mounted thereon with an water outlet thereof directed downward.

6. The water feed apparatus for the core drill according to claim 3, wherein a flexible tube for guiding water from inside the water storage tank to the water passage is coupled at one end thereof to the tank mounting portion of the adapter, and equipped at an opposite end thereof with a sinker.

7. The water feed apparatus for the core drill according to claim 6, wherein the tube is constructed such that the opposite end is located downwardly inside the water storage tank by a gravitational weight of the sinker, irrespective of a posture of the water storage tank.

* * * * *

UNITED STATES PATENT AND TRADEMARK OFFICE

CERTIFICATE OF CORRECTION

PATENT NO. : 8,419,321 B2
APPLICATION NO. : 11/813670
DATED : April 16, 2013
INVENTOR(S) : Masaaki Miyanaga It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1646 days.

Signed and Sealed this
First Day of September, 2015

Michelle K. Lee
*Director of the United States Patent and Trademark Office*